Patented Nov. 28, 1922.

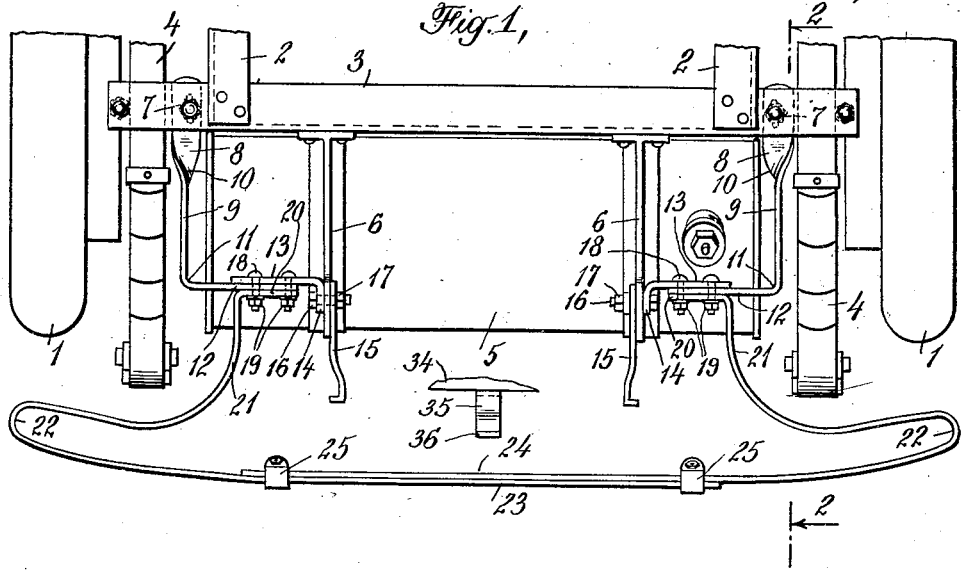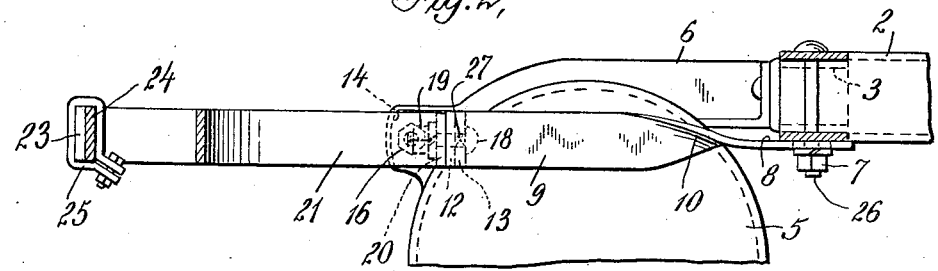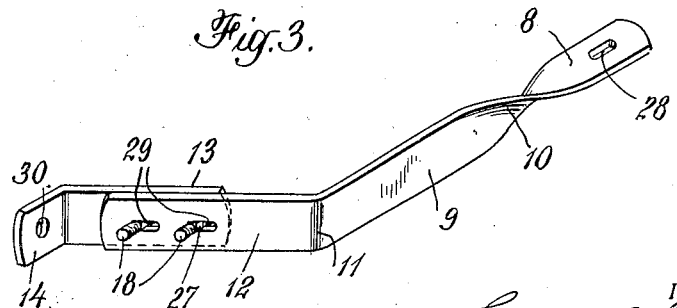

1,436,994

UNITED STATES PATENT OFFICE.

GEORGE ALBERT LYON, OF PHILADELPHIA, PENNSYLVANIA.

REAR-BUFFER-ATTACHING DEVICE.

Application filed March 27, 1922. Serial No. 547,327.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Rear-Buffer-Attaching Devices, of which the following is a specification taken in connection with the accompanying drawing.

This invention relates especially to attaching devices for securing spring strip or other automobile buffers to the rear of automobiles of the Dodge type. For this purpose a buffer bracket may be formed of spring steel strip which may have a horizontally positioned or twisted clamping end bolted to the spring support or other part of the automobile and having an inturned vertical attaching portion to which the inturned attaching end of the buffer may be bolted or connected. If desired also the buffer bracket may be stiffened and strengthened by clamping thereto a supporting bracket which may be bolted or connected to the tank support of the automobile so that a strong and substantially rigid support is thus formed for the spring strip or other buffer which may be of the Lyon type, if desired. In some cases it is advantageous also to form the supporting bracket with an integral or other tire holder portion which may extend out rearwardly so as to engage the ordinary tire rim on each side of the tank while a similar tire holder of any desired construction may be secured to the car body and engage the upper part of the rim.

In the accompanying drawing which shows in a somewhat diagrammatic way an illustrative embodiment of this invention:

Fig. 1 is a plan view showing the device in position on the rear of a Dodge automobile.

Fig. 2 is a side sectional view thereof taken substantially along the line 2—2 of Fig. 1, and Fig. 3 is a diagrammatic perspective view showing one of the buffer brackets and cooperating supporting bracket.

The buffer used in connection with this attaching device preferably comprises spring strip attaching members such as 21 which are formed with integral or other inturned attaching ends 20 which may be provided with suitable bolt holes or slots for connection with the attaching device. In the case of a Lyon type buffer the attaching members may have integral end loops 22 and front impact receiving members 23, 24 which may be adjustably or otherwise connected together as by the clips 25. The attaching device may be formed of a number of strips or members of generally similar spring steel strip and may comprise two buffer brackets, one of which may be bolted or otherwise connected to each of the attaching members of the buffer. As shown in Figs. 1 and 3 the buffer bracket preferably comprises a vertical rearwardly extending body portion 9 which may be bent at 11 so as to form the inturned vertical attaching portion 12 in which one or more bolt holes or slots 29 may be formed. Bolts such as 18 which preferably have square or other noncircular shanks 27 to engage the slots 29 may be used to rigidly connect the inturned attaching end 20 of the buffer to this bracket when the nuts 19 are tightened.

The forward end of the buffer bracket may be bolted or connected to the automobile frame in any suitable way and the bracket is preferably twisted at the point 10 so as to form a substantially horizontal clamping end 8 in which the slot or bolt aperture 28 may be formed. This is adapted to fit beneath the frame brace 3 adjacent the frame channel 2 and be bolted thereto as by one of the spring bolts 26, the nut 7 being taken off so as to allow this clamping end of the bracket to be slipped over the bolt and then securely clamped in position by the nut and lock washer shown in Fig. 2. The attaching portion of the buffer bracket may be considerably stiffened and strengthened by bolting or clamping thereto a cooperating supporting bracket 13 having holes or slots for the bolts 18 and having a bent clamping portion 14 provided with a hole 30 and which may be bolted to the vertical flange of the tank support 6 as by the bolt 16 and nut 17 as shown in Fig. 1. In this way a strong and rigid support is formed for the attaching end of the buffer which is prevented from moving undesirably in a vertical direction under running conditions by the buffer bracket which because of the vertical position of its strip steel body is substantially rigid under such vertical forces. Also by having some slight clearance in the slots or bolt apertures in either the buffer bracket or supporting bracket any slight irregularity in the positioning of the parts to which these members are secured may be taken care of which considerably facilities the attachment of the buffer supporting devices under ordinary conditions.

A tire holder member may also be provided in connection with the supporting bracket and the steel strip tire holder 15 may be bolted in position on either side of the flange of the tank support 6 when the supporting bracket is connected thereto and these tire holders on each side of the tank may have any suitable shape and construction at their rim engaging ends so as to secure and support the tire rim in connection with an upper tire holder 35 bolted or secured to the car body 34 and having an end rim engaging flange 36, if desired. Of course, in removing the tire from these devices it is only necessary to loosen one of the tire holders as by loosening or removing the nut 17 or a special outer locking nut on this bolt 16 so that sufficient movement of the tire holder is possible to remove and replace the tire rim.

This invention has been described in connection with a number of embodiments, forms, proportions, parts, arrangements, materials, methods of connection and use, to the details of which disclosure the invention is not of course to be limited since what is claimed as new and what is desired to be secured by Letters Patent is set forth in the appended claims.

I claim—

1. In automobile buffer devices, a spring strip buffer comprising overlapping impact receiving members adjustably connected in mutually reenforcing position and connected end loops and attaching members formed with inturned apertured attaching ends, spring strip buffer brackets having inturned vertical attaching portions formed with slots and having forwardly extending body portions formed with twisted substantially horizontal clamping ends adapted to be bolted to the automobile frame members, supporting brackets having attaching portions to be bolted to said buffer brackets and the inturned attaching ends of said buffer and each having a clamping portion adapted to be bolted to the tank support of the automobile and form a substantially rigid support for the buffer end, and spring strip tire holders adapted to be simultaneously bolted to said tank supports adjacent said supporting brackets.

2. In automobile buffer devices, a spring strip buffer comprising overlapping impact receiving members adjustably connected in mutually reenforcing position and connected end loops and attaching members formed with inturned apertured attaching ends, spring strip buffer brackets having inturned vertical attaching portions formed with slots and having forwardly extending body portions formed with clamping ends adapted to be bolted to the automobile frame members, supporting brackets having attaching portions to be bolted to said buffer brackets and the inturned attaching ends of said buffer and each having a clamping portion adapted to be bolted to the automobile and form a substantially rigid support for the buffer end.

3. In automobile buffer devices, a spring strip buffer comprising impact receiving members, connected end loops and attaching members formed with inturned apertured attaching ends, steel strip buffer brackets having inturned vertical attaching portions formed with slots and having longitudinally extending body portions formed with clamping ends adapted to be bolted to the automobile frame members, and supporting brackets having attaching portions to be connected to said buffer brackets and the inturned attaching ends of said buffer and each having a clamping portion adapted to be bolted to the automobile.

4. In automobile buffer devices, a spring strip buffer comprising impact receiving members, connected end loops and attaching members formed with inturned attaching ends, steel strip buffer brackets having inturned attaching portions and having longitudinally extending body portions formed with clamping ends adapted to be bolted to the automobile and supporting brackets having attaching portions to be connected to said buffer brackets and the inturned attaching ends of said buffer and each having a clamping portion adapted to be bolted to the automobile.

5. In automobile buffer devices, a spring strip buffer comprising impact receiving members, connected end loops and attaching members formed with attaching ends, steel strip buffer brackets having attaching portions and having longitudinally extending body portions formed with clamping ends adapted to be bolted to the automobile, and supporting brackets having attaching portions to be connected to said buffer brackets and the attaching ends of said buffer and each having an adjacent clamping portion adapted to be bolted to the automobile.

6. In automobile buffer devices, a buffer comprising impact receiving members, connected end loops and attaching ends, steel strip buffer brackets having inturned vertical attaching portions formed with apertures and having longitudinally extending body portions formed with clamping ends adapted to be secured to the automobile, and relatively short supporting brackets having attaching portions to be connected to said buffer brackets and the attaching ends of said buffer and having transversely extending clamping portions adapted to be secured to the automobile.

7. In automobile buffer devices, a buffer comprising impact receiving members, connected end loops and attaching ends, steel strip buffer brackets having attaching portions formed with apertures and having longitudinally extending body portions formed with clamping ends adapted to be secured to the automobile, and supporting brackets having attaching portions to be connected to said buffer brackets and the attaching ends of said buffer and having transversely extending clamping portions adapted to be secured to the automobile.

8. In automobile buffer devices, a buffer comprising impact receiving members, connected end loops and attaching ends, steel strip buffer brackets having attaching portions formed with apertures and having longitudinally extending body portions formed with clamping ends adapted to be secured to the automobile, and supporting brackets having attaching portions to be connected to said buffer brackets and the attaching ends of said buffer and having transversely extending clamping portions adapted to be secured to the automobile and tire holders adapted to be bolted to the said supporting brackets.

9. In rear automobile buffer devices, a spring strip buffer comprising impact receiving members and connected end loops and attaching members formed with inturned apertured attaching ends, steel strip buffer brackets having inturned vertical portions and having forwardly extending body portions formed with clamping ends adapted to be bolted to the automobile, supporting brackets having attaching portions to be bolted to said buffer brackets and the inturned attaching ends of said buffer and having clamping portions adapted to be bolted to the automobile, and steel strip tire holders adapted to be simultaneously bolted to said supporting brackets.

10. In rear automobile buffer devices, a spring strip buffer comprising impact receiving members and connected end loops and attaching members formed with attaching ends, steel strip buffer brackets having vertical portions and having forwardly extending body portions formed with clamping ends adapted to be bolted to the automobile, supporting brackets having attaching portions to be connected to said buffer brackets and having clamping portions adapted to be bolted to the automobile, and steel strip tire holders adapted to be connected to said supporting bracket.

11. In automobile buffer attaching devices, a pair of spring steel buffer brackets each having a vertically arranged inturned attaching portion and a forwardly extending substantially vertical body portion formed with a horizontally twisted clamping end adapted to be connected to the rear spring bolt of a Dodge automobile, and a pair of cooperating supporting brackets having apertured attaching portions adapted to be bolted to the attaching portions of said buffer brackets and to the inturned attaching ends of buffer attaching members, each of said supporting brackets having a bent clamping portion to be bolted to the flange of a tank support and rigidly support its attaching portion therefrom.

12. In automobile buffer attaching devices, a pair of steel buffer brackets each having an inturned attaching portion and a forwardly extending substantially vertical body portion formed with a clamping end adapted to be connected to the rear of a Dodge automobile, and a pair of cooperating supporting brackets having apertured attaching portions adapted to be bolted to the attaching portions of said buffer brackets and to the attaching ends of buffer attaching members, each of said supporting brackets having a bent clamping portion to be bolted to the flange of a tank support and rigidly support its attaching portion therefrom.

13. In automobile buffer attaching devices, a pair of steel strip buffer brackets each having an inturned apertured attaching portion and a forwardly extending substantially vertical body portion formed with an apertured horizontally twisted clamping end adapted to be connected to a rear frame member of an automobile, and a pair of cooperating relatively short supporting brackets having apertured attaching portions adapted to be bolted to the attaching portions of said buffer brackets and to the inturned attaching ends of buffer attaching members, each of said supporting brackets having a bent clamping portion adapted to be connected to the flange of a tank supporting member of the automobile and rigidly support its attaching portion therefrom.

14. In automobile buffer attaching devices, a pair of steel strip buffer brackets each having an inturned apertured attaching portion and a forwardly extending body portion formed with a clamping end adapted to be connected to a rear frame member of an automobile, and a pair of cooperating relatively short supporting brackets having apertured attaching portions adapted to be bolted to the attaching portions of said buffer brackets, each of said supporting brackets having a bent clamping portion adapted to be connected to the flange of a supporting member of the automobile.

15. In automobile buffer attaching devices, a pair of steel strip buffer brackets each having a vertically arranged transversely extending attaching portion and a forwardly extending relatively long substantially vertical longitudinally extending body portion formed with a clamping end adapted to be connected to the automobile, and a pair of cooperating relatively short supporting brackets having attaching portions adapted to be connected to the attaching portions of said buffer brackets and to the buffer attaching members, each of said supporting brackets having a bent clamping portion adapted to be bolted to a flanged member of the automobile.

16. In automobile buffer attaching devices, a pair of steel strip buffer brackets each having a transversely extending attaching portion and a longitudinally extending body portion formed with a clamping end adapted to be connected to the automobile, and a pair of cooperating relatively short supporting brackets having attaching portions adapted to be connected to the attaching portions of said buffer brackets and to the buffer attaching members, each of said supporting brackets having a portion adapted to be bolted to the automobile.

GEORGE ALBERT LYON.